No. 882,488. PATENTED MAR. 17, 1908.
E. D. CHAPLIN.
SHAVING APPLIANCE.
APPLICATION FILED FEB. 2, 1907.
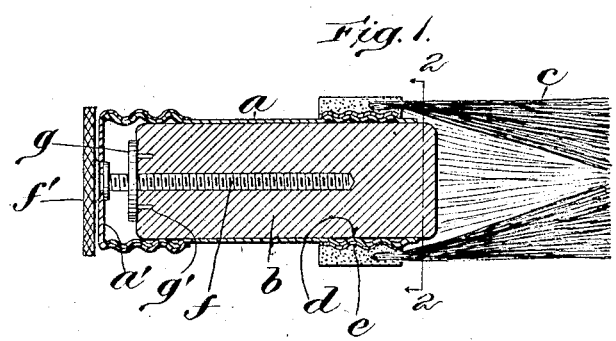
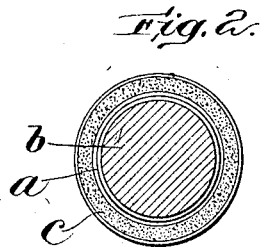
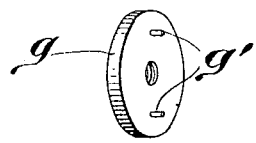
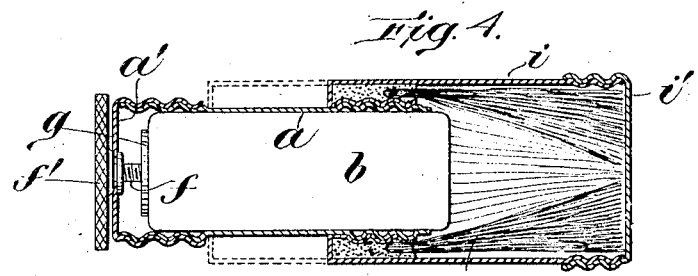
Witnesses: Inventor:
E. D. Chaplin
by Wright Brown Quinby & May
Attorneys.

UNITED STATES PATENT OFFICE.

EDWIN D. CHAPLIN, OF BOSTON, MASSACHUSETTS, ASSIGNOR TO WILLARD E. ROBINSON, OF MALDEN, MASSACHUSETTS.

SHAVING APPLIANCE.

No. 882,488.        Specification of Letters Patent.        Patented March 17, 1908.

Application filed February 2, 1907. Serial No. 355,378.

*To all whom it may concern:*

Be it known that I, EDWIN D. CHAPLIN, of Boston, in the county of Suffolk and State of Massachusetts, have invented certain new and useful Improvements in Shaving Appliances, of which the following is a specification.

This invention has for its chief object to provide a shaving appliance in which are included a brush, and a holder for a soap-stick, the said parts being so related that the brush and soap-stick may be applied to the face simultaneously and means for adjusting the stick to compensate for wear.

The invention consists in improvements which I will now proceed to describe and claim.

Of the accompanying drawings forming a part of this specification,—Figure 1 represents a longitudinal section of a shaving appliance embodying my invention. Fig. 2 represents a section on line 2—2 of Fig. 1. Fig. 3 represents a perspective view of one of the parts detached. Fig. 4 represents a sectional view showing the brush cover.

The same letters of reference indicate the same parts in all the figures.

In the drawings, $a$ represents a hollow handle which is of sufficient size to receive the whole or a part of a stick $b$ of shaving soap, and is open at one end to permit the stick to project, as shown in Fig. 1. The opposite end of the handle is closed by an end piece or head $a'$, which is preferably detachably secured to the handle by a screw-thread connection.

$c$ represents a brush which is secured to the handle and projects from the open end thereof, the brush being contiguous to the projecting end of the soap-stick so that both the brush and stick may be applied to the face simultaneously. The handle $a$ is preferably cylindrical and the brush $c$ is preferably annular and formed to surround the open end of the handle. I have here shown the brush detachably secured to the handle by means of an external screw-thread $d$ on the handle and an internal screw-thread $e$ on the brush.

$f$ represents a screw-threaded rod which is journaled in the head $a'$ of the handle and projects into the interior of the latter, the said rod having an operating handle $f'$ at its outer end, the said handle being preferably a disk with a milled edge.

$g$ represents a nut or follower which is engaged with the screw-threaded rod $f$ and is adapted to bear on the inner end of the soap-stick $b$. The said nut is preferably provided with pins or projections $g'$ adapted to penetrate the soap-stick.

In preparing the described appliance for use, the soap-stick is forced into the handle, the rod $f$ penetrating the stick. The diameter of the handle $a$ is such that the soap-stick fits the interior of the handle somewhat closely so that the stick will not rotate with the rod $f$. It will be seen therefore that, when the rod is rotated, the nut $g$, which is also prevented from rotating, is moved longitudinally of the rod and adjusts the soap-stick. The preferred adjustment of the soap-stick is substantially as indicated in Fig. 1, the outer end of the brush projecting somewhat beyond the outer end of the stick.

It will be seen that the brush and soap-stick may be applied simultaneously to the face at the commencement of the operation of lathering, and that, after a sufficient quantity of soap has been applied, the brush may be used independently.

In Fig. 4, I show a brush cover composed of an inner section $i$ which is adapted to slide on the handle, and an outer section $i'$ adapted for detachable engagement with the section $i$ by means of screw-threads on said sections. When the brush is in use, the section $i'$ is removed and the inner section $i$ is moved upwardly on the handle, as indicated by dotted lines.

What I claim is:—

1. A shaving appliance comprising a hollow handle open at one end to receive a stick of soap, a screw journaled in the closed end of said handle and projecting into the interior thereof, said screw being adapted to enter the soap stick, means for rotating the screw, a flat disk working on said screw and having one face provided with means to engage the end of said soap stick to prevent relative rotation thereof, whereby rotation of the screw will cause said disk to feed the soap stick forward, and a brush contiguous to the open end of said handle.

2. A shaving appliance comprising a hollow handle open at one end to receive a stick of soap, a screw journaled in the closed end of said handle and projecting into the interior thereof, an operating handle on said screw, a disk working on said screw and having its under face provided with pins adapted to engage the end of said soap stick to prevent relative rotation thereof, and a brush contiguous to the open end of said handle.

In testimony whereof I have affixed my signature, in presence of two witnesses.

EDWIN D. CHAPLIN.

Witnesses:
  C. F. BROWN,
  FRED FARROW.